United States Patent
Zielke (10) Patent No.: US 12,507,627 B2
(45) Date of Patent: Dec. 30, 2025

(54) METHOD FOR WARNING OF A SHELLED EAR EVENT

(71) Applicant: Ag Leader Technology, Ames, IA (US)

(72) Inventor: Roger Zielke, Huxley, IA (US)

(73) Assignee: Ag Leader Technology, Ames, IA (US)

( * ) Notice: Subject to any disclaimer, the term of this patent is extended or adjusted under 35 U.S.C. 154(b) by 696 days.

(21) Appl. No.: 17/225,586

(22) Filed: Apr. 8, 2021

(65) Prior Publication Data

US 2021/0315160 A1 Oct. 14, 2021

Related U.S. Application Data

(60) Provisional application No. 63/006,774, filed on Apr. 8, 2020.

(51) Int. Cl.
*A01D 41/127* (2006.01)
*A01D 45/02* (2006.01)
*G01B 21/06* (2006.01)
*G01D 21/00* (2006.01)

(52) U.S. Cl.
CPC ......... *A01D 45/021* (2013.01); *A01D 41/127* (2013.01); *A01D 41/1273* (2013.01); *G01B 21/06* (2013.01); *G01D 21/00* (2013.01)

(58) Field of Classification Search
CPC .. A01D 45/021; A01D 45/028; A01D 41/127; A01D 41/1271; A01D 41/1272; A01D 41/1273
See application file for complete search history.

(56) References Cited

U.S. PATENT DOCUMENTS

| | | |
|---|---|---|
| 2,419,061 A | 4/1947 | Emery |
| 2,813,709 A | 11/1957 | Hyman |
| 3,038,544 A | 6/1962 | Richey et al. |
| 3,178,873 A | 4/1965 | Meyer |
| 3,246,701 A | 4/1966 | Horst |
| 3,271,940 A | 9/1966 | Robert |
| 3,616,690 A | 11/1971 | Harden |

(Continued)

FOREIGN PATENT DOCUMENTS

| | | |
|---|---|---|
| AU | 2020201559 A1 | 4/2020 |
| BE | 1023764 B1 | 7/2017 |

(Continued)

OTHER PUBLICATIONS

Baweja et al., "StalkNet: A Deep Learning Pipeline for High-throughput Measurement of Plant Stalk Count and Stalk Width".

(Continued)

*Primary Examiner* — Adam J Behrens
*Assistant Examiner* — Ashley A Kaercher
(74) *Attorney, Agent, or Firm* — DENTONS DAVIS BROWN PC; Matthew Warner-Blankenship; Kassandra Ricklefs (57) ABSTRACT

Disclosed herein are various devices, systems, and methods for use in agricultural, particularly for use in harvesting agricultural crop such as corn. Various implementations relate to devices, systems, and methods for increasing yield by emitting warnings when the corn head to not at the proper height.

4 Claims, 10 Drawing Sheets

(56) References Cited

U.S. PATENT DOCUMENTS

| | | |
|---|---|---|
| 3,780,817 A | 12/1973 | Videon |
| 3,853,000 A | 12/1974 | Barnett |
| T934,002 I4 | 5/1975 | Trail |
| 3,972,381 A | 8/1976 | Gail |
| 3,992,933 A | 11/1976 | Randolph |
| 4,121,049 A | 10/1978 | Roeber |
| 4,126,984 A | 11/1978 | Gail |
| 4,166,349 A | 9/1979 | Coenenberg et al. |
| 4,197,690 A | 4/1980 | Eistert |
| 4,295,323 A | 10/1981 | Maier et al. |
| 4,362,218 A | 12/1982 | Shoberg |
| 4,418,521 A | 12/1983 | Orlando |
| 4,423,640 A | 1/1984 | Jetter |
| 4,505,094 A | 3/1985 | Demorest |
| 4,528,804 A * | 7/1985 | Williams ............ A01B 69/008 180/401 |
| 4,751,849 A | 6/1988 | Paros |
| 4,883,964 A | 11/1989 | Bohman |
| 4,896,491 A | 1/1990 | Warnsholz |
| 4,918,441 A | 4/1990 | Bohman |
| 4,967,362 A | 10/1990 | Schutten et al. |
| 5,044,210 A | 9/1991 | Kuhn et al. |
| 5,216,795 A | 6/1993 | Hansson |
| 5,264,709 A | 11/1993 | Kamimura |
| 5,343,761 A | 9/1994 | Myers |
| 5,369,603 A | 11/1994 | Myers |
| 5,463,854 A | 11/1995 | Chmielewski, Jr. |
| 5,480,354 A | 1/1996 | Sadjadi |
| 5,568,405 A | 10/1996 | Easton et al. |
| 5,598,794 A | 2/1997 | Harms et al. |
| 5,680,750 A * | 10/1997 | Stefl ................ A01D 45/021 56/99 |
| 5,751,576 A | 5/1998 | Monson |
| 5,790,428 A | 8/1998 | Easton et al. |
| 5,847,290 A | 12/1998 | Kim |
| 5,878,561 A | 3/1999 | Gunn |
| 5,921,070 A | 7/1999 | Chamberlain |
| 5,927,054 A | 7/1999 | Chamberlain |
| 5,991,694 A | 11/1999 | Gudat et al. |
| 6,041,583 A | 3/2000 | Goering |
| 6,073,427 A | 6/2000 | Nichols |
| 6,085,846 A | 7/2000 | Buchl et al. |
| 6,119,442 A | 9/2000 | Hale |
| 6,202,395 B1 | 3/2001 | Gramm |
| 6,216,795 B1 | 4/2001 | Buchl |
| 6,272,819 B1 | 8/2001 | Wendte |
| 6,431,981 B1 | 8/2002 | Shinners |
| 6,530,197 B1 | 3/2003 | Christensen |
| 6,584,390 B2 | 6/2003 | Beck |
| 6,615,570 B2 | 9/2003 | Beck |
| 6,668,223 B2 | 12/2003 | Blackmore et al. |
| 6,774,320 B2 | 8/2004 | Simons |
| 6,983,582 B1 | 1/2006 | Muckler |
| 7,354,341 B1 | 4/2008 | Smith |
| 7,357,036 B2 | 4/2008 | Steprath |
| 7,401,506 B2 | 7/2008 | Kunow |
| 7,401,528 B2 | 7/2008 | Deppermann et al. |
| 7,647,753 B2 | 1/2010 | Schlipf |
| 7,716,905 B2 | 5/2010 | Wilcox et al. |
| 7,739,861 B2 | 6/2010 | Mackin |
| 7,790,991 B2 | 9/2010 | Verhaeghe |
| 7,916,898 B2 | 3/2011 | Anderson |
| 8,006,472 B1 | 8/2011 | Schreiner |
| 8,010,261 B2 | 8/2011 | Brubaker |
| 8,196,380 B2 | 6/2012 | Carboni |
| 8,201,388 B1 | 6/2012 | Vandeven |
| 8,215,191 B2 | 7/2012 | Tragesser et al. |
| 8,220,235 B2 | 7/2012 | Kowalchuk |
| 8,224,534 B2 | 7/2012 | Kowalchuk |
| 8,418,636 B2 | 4/2013 | Liu et al. |
| 8,820,039 B2 | 9/2014 | Werning |
| 8,987,615 B2 | 3/2015 | Khatavkar |
| 9,030,549 B2 | 5/2015 | Redden |
| 9,064,173 B2 | 6/2015 | Redden |
| 9,066,463 B2 | 6/2015 | Lange |
| 9,213,905 B2 | 12/2015 | Lange |
| 9,232,693 B2 | 1/2016 | Hendrickson et al. |
| 9,282,693 B2 | 3/2016 | Anderson |
| 9,310,329 B2 | 4/2016 | Acheson et al. |
| 9,320,196 B2 | 4/2016 | Dybro et al. |
| 9,322,629 B2 | 4/2016 | Sauder et al. |
| 9,360,383 B2 | 6/2016 | Coleman |
| 9,372,109 B2 | 6/2016 | Acheson et al. |
| 9,410,840 B2 | 8/2016 | Acheson et al. |
| 9,423,249 B2 | 8/2016 | Deppermann et al. |
| 9,485,914 B2 | 11/2016 | Schleicher et al. |
| 9,565,802 B2 | 2/2017 | Schleicher |
| 9,578,804 B2 | 2/2017 | Gessel |
| 9,578,808 B2 | 2/2017 | Dybro |
| 9,609,806 B2 | 4/2017 | Schlipf |
| 9,645,006 B2 | 5/2017 | Phelan |
| 9,658,201 B2 | 5/2017 | Redden et al. |
| 9,668,412 B2 | 6/2017 | Ritter |
| 9,668,420 B2 | 6/2017 | Anderson |
| 9,693,496 B2 | 7/2017 | Tevs et al. |
| 9,693,503 B2 | 7/2017 | Dybro et al. |
| 9,696,162 B2 | 7/2017 | Anderson |
| 9,717,171 B2 | 8/2017 | Redden et al. |
| 9,756,771 B2 | 9/2017 | Redden |
| 9,804,097 B1 | 10/2017 | Tang et al. |
| 9,826,673 B1 | 11/2017 | Ray |
| 9,832,928 B2 | 12/2017 | Dybro et al. |
| 9,867,334 B2 | 1/2018 | Jongmans et al. |
| 9,867,335 B1 | 1/2018 | Obbink et al. |
| 9,894,835 B2 | 2/2018 | Sauder et al. |
| 9,921,064 B2 | 3/2018 | Schleicher |
| 9,927,242 B2 | 3/2018 | Schleicher |
| 9,936,631 B1 | 4/2018 | Hubner et al. |
| 9,936,637 B2 | 4/2018 | Anderson et al. |
| 9,972,058 B2 | 5/2018 | Romier |
| 9,974,233 B2 | 5/2018 | Ueda et al. |
| 10,034,424 B2 | 7/2018 | Anderson et al. |
| 10,039,228 B2 | 8/2018 | Walker |
| 10,039,231 B2 | 8/2018 | Anderson et al. |
| 10,130,035 B2 | 11/2018 | Crow |
| 10,178,828 B2 | 1/2019 | Hendrickson et al. |
| 10,188,037 B2 | 1/2019 | Sauder |
| 10,255,670 B1 | 4/2019 | Wu |
| 10,295,703 B2 | 5/2019 | Dybro |
| 10,299,422 B2 | 5/2019 | Schleicher |
| 10,473,592 B2 | 11/2019 | Kramer et al. |
| 10,537,060 B2 | 1/2020 | Sauder et al. |
| 10,582,662 B2 | 3/2020 | Ricketts |
| 10,713,768 B2 | 7/2020 | Berghoefer |
| 10,820,508 B2 | 11/2020 | Dix et al. |
| 10,859,479 B2 | 12/2020 | Brune et al. |
| 11,048,938 B2 | 6/2021 | Hundley et al. |
| 11,064,653 B2 | 7/2021 | Zielke |
| 11,079,725 B2 | 8/2021 | Palla |
| 11,129,333 B2 | 9/2021 | Derscheid |
| 11,234,366 B2 | 2/2022 | Darr |
| 11,275,941 B2 | 3/2022 | Papanikolopoulos et al. |
| 11,297,768 B2 | 4/2022 | Schildroth et al. |
| 11,432,464 B2 | 9/2022 | Hayashi |
| 11,678,607 B2 | 6/2023 | Zielke |
| 11,704,810 B2 | 7/2023 | Sneyders |
| 11,758,845 B2 | 9/2023 | Zielke |
| 11,758,848 B2 | 9/2023 | Eichhorn |
| 2002/0091458 A1 | 7/2002 | Moore |
| 2002/0173893 A1 | 11/2002 | Blackmore et al. |
| 2003/0019196 A1 | 1/2003 | Coers |
| 2004/0050138 A1 | 3/2004 | Beck |
| 2004/0194442 A1 | 10/2004 | Maertens |
| 2007/0044445 A1 | 3/2007 | Spicer et al. |
| 2007/0228707 A1 | 10/2007 | Curtis |
| 2007/0289281 A1 | 12/2007 | Altepost |
| 2008/0046154 A1 | 2/2008 | Bares |
| 2009/0192734 A1 | 7/2009 | Mackin |
| 2010/0089178 A1 | 4/2010 | Tragresser |
| 2011/0173942 A1 | 7/2011 | Kowalchuk |
| 2012/0029757 A1 | 2/2012 | Kowalchuk |
| 2012/0042618 A1 | 2/2012 | Lohrentz |
| 2012/0042619 A1 | 2/2012 | Lohrentz et al. |
| 2012/0055131 A1 | 3/2012 | Zegota |

(56) References Cited

U.S. PATENT DOCUMENTS

| | | |
|---|---|---|
| 2012/0055133 A1 | 3/2012 | Lohrentz |
| 2012/0204528 A1 | 8/2012 | Regier |
| 2012/0253611 A1 | 10/2012 | Zielke |
| 2013/0125800 A1 | 5/2013 | Landphair et al. |
| 2013/0152535 A1 | 6/2013 | Roberge |
| 2014/0020354 A1 | 1/2014 | Tilly |
| 2014/0116077 A1 | 5/2014 | Pierce |
| 2014/0230391 A1* | 8/2014 | Hendrickson ...... G01N 33/0098 702/2 |
| 2014/0230580 A1* | 8/2014 | Dybro ...................... G01L 1/00 56/103 |
| 2014/0236381 A1* | 8/2014 | Anderson .............. A01D 75/00 701/1 |
| 2014/0294247 A1 | 10/2014 | Sirault |
| 2014/0311113 A1 | 10/2014 | Bonefas |
| 2014/0331631 A1 | 11/2014 | Sauder |
| 2015/0082760 A1 | 3/2015 | Zentner |
| 2015/0082780 A1 | 3/2015 | Dueckinghaus |
| 2015/0257337 A1 | 9/2015 | Schrattenecker |
| 2015/0289438 A1 | 10/2015 | Sauder et al. |
| 2015/0293029 A1 | 10/2015 | Acheson |
| 2015/0293068 A1 | 10/2015 | Acheson et al. |
| 2015/0302305 A1 | 10/2015 | Rupp |
| 2015/0319929 A1 | 11/2015 | Hendrickson |
| 2015/0327440 A1 | 11/2015 | Dybro |
| 2015/0334920 A1 | 11/2015 | Schleicher |
| 2016/0037709 A1 | 2/2016 | Sauder et al. |
| 2016/0041803 A1 | 2/2016 | Markov |
| 2016/0084813 A1 | 3/2016 | Anderson |
| 2016/0084987 A1* | 3/2016 | Dybro .................... G01V 99/00 702/5 |
| 2016/0120129 A1 | 5/2016 | Verhaeghe |
| 2016/0174465 A1 | 6/2016 | Kohls |
| 2016/0338267 A1 | 11/2016 | Anderson |
| 2016/0345485 A1 | 12/2016 | Acheson |
| 2017/0061211 A1 | 3/2017 | Hundley et al. |
| 2017/0089742 A1 | 3/2017 | Bruns |
| 2017/0199528 A1 | 7/2017 | Detweiler |
| 2017/0228118 A1 | 8/2017 | Sugumarn et al. |
| 2017/0251600 A1 | 9/2017 | Anderson |
| 2017/0332551 A1 | 11/2017 | Todd |
| 2017/0339827 A1 | 11/2017 | Anderson |
| 2018/0017965 A1 | 1/2018 | Kosa |
| 2018/0084725 A1 | 3/2018 | Ostermeier |
| 2018/0092303 A1 | 4/2018 | Goering |
| 2018/0121725 A1 | 5/2018 | Redden |
| 2018/0164471 A1 | 6/2018 | Dybro |
| 2018/0199509 A1 | 7/2018 | Ricketts |
| 2018/0228086 A1 | 8/2018 | Cook |
| 2018/0338423 A1 | 11/2018 | Lucca |
| 2018/0368321 A1 | 12/2018 | Noonan |
| 2018/0373259 A1 | 12/2018 | Aberle |
| 2019/0000007 A1 | 1/2019 | Schleicher |
| 2019/0059223 A1 | 2/2019 | Seiders |
| 2019/0110394 A1 | 4/2019 | VanNahmen |
| 2019/0150357 A1 | 5/2019 | Wu |
| 2019/0174667 A1 | 6/2019 | Gresch |
| 2019/0195762 A1 | 6/2019 | Brune |
| 2019/0258859 A1 | 8/2019 | Baynes |
| 2019/0261561 A1 | 8/2019 | Heitmann |
| 2020/0000034 A1 | 1/2020 | Schlipf |
| 2020/0008351 A1* | 1/2020 | Zielke .................... G01B 5/025 |
| 2020/0053961 A1 | 2/2020 | Dix |
| 2020/0060056 A1 | 2/2020 | Koch |
| 2020/0068803 A1 | 3/2020 | Sauder et al. |
| 2020/0326674 A1 | 10/2020 | Palla |
| 2020/0394580 A1 | 12/2020 | Bull |
| 2021/0051849 A1 | 2/2021 | Asebedo |
| 2021/0059114 A1* | 3/2021 | Eichhorn ............. G01B 5/0035 |
| 2021/0076569 A1 | 3/2021 | Blank |
| 2021/0132618 A1 | 5/2021 | Van Roekel |
| 2021/0168991 A1 | 6/2021 | Dix |
| 2021/0195824 A1 | 7/2021 | Van Roekel |
| 2021/0315160 A1 | 10/2021 | Zielke |
| 2021/0318118 A1 | 10/2021 | Eichhorn |
| 2021/0321567 A1 | 10/2021 | Sidon |
| 2021/0329837 A1 | 10/2021 | Schnaider |
| 2021/0329838 A1* | 10/2021 | Zielke .................... G01B 17/00 |
| 2021/0352847 A1 | 11/2021 | Hunt |
| 2022/0000024 A1 | 1/2022 | Zielke |
| 2022/0071093 A1 | 3/2022 | Risius |
| 2022/0078975 A1 | 3/2022 | Slichter |
| 2022/0132737 A1 | 5/2022 | Anderson |
| 2022/0225569 A1 | 7/2022 | Zielke |
| 2022/0232759 A1 | 7/2022 | Sauder |
| 2022/0317688 A1 | 10/2022 | Li |
| 2022/0386527 A1 | 12/2022 | Schleicher |
| 2023/0000015 A1 | 1/2023 | Herrmann |
| 2023/0073551 A1 | 3/2023 | Holoubek |
| 2023/0139169 A1 | 5/2023 | Cleodolphi |
| 2023/0189690 A1 | 6/2023 | Friedlein |
| 2023/0229163 A1 | 7/2023 | Rust |
| 2023/0240185 A1 | 8/2023 | Zielke |
| 2023/0243693 A1 | 8/2023 | McClelland |
| 2023/0292664 A1 | 9/2023 | Zielke |
| 2023/0389473 A1 | 12/2023 | Reed |
| 2023/0401703 A1 | 12/2023 | Friedlein |
| 2024/0023482 A1 | 1/2024 | Zielke |
| 2024/0065156 A1 | 2/2024 | Woodcock |
| 2024/0081171 A1 | 3/2024 | Schwartz |
| 2024/0090379 A1 | 3/2024 | Eichhorn |
| 2024/0373785 A1 | 11/2024 | Risius |
| 2024/0389494 A1 | 11/2024 | Vorobiev |
| 2025/0185540 A1 | 6/2025 | Eichhorn |
| 2025/0194459 A1 | 6/2025 | Roe |

FOREIGN PATENT DOCUMENTS

| | | |
|---|---|---|
| BR | 102017018379 A2 | 5/2018 |
| CA | 2313376 | 7/2000 |
| DE | 1928065 | 5/1970 |
| DE | 112014000906 T5 | 11/2015 |
| EP | 2191439 B1 | 2/2009 |
| EP | 2047738 A2 | 4/2009 |
| EP | 3146831 | 3/2017 |
| EP | 2944179 | 11/2017 |
| EP | 3245859 A1 | 11/2017 |
| EP | 3245859 | 4/2019 |
| EP | 3095313 | 5/2019 |
| EP | 3972381 | 3/2022 |
| JP | 6216795 | 10/2017 |
| WO | WO-2013078328 A2 * | 5/2013 ........... A01B 79/005 |

OTHER PUBLICATIONS

Birrell et al., "Corn Population Sensor for Precision Farming", American Society of Agricultural Engineers. Annual Meeting, 1995, vol. 95, No. 1334, Publisher: ASAE.

"Harvest Study Reveals most corn heads leaving yield in the field.", 2020 Special Report, 2020, Row by Row.

Farm Show, "Easton Goers, Inc. Space Wheel Checks Seed Placement In Field—Space Cadet", 1996, Publisher: Farm Show.

D. Easton, "Corn Population and Plant Spacing Variability: The Next Mapping Layer", 1996, pp. 723-727, Publisher: ASA-CSSA-SSSA, Published in: Madison, WI.

Hummel et al., "Sensing Corn Population—Another Variable in the Yield Equation".

Jonathan P. Kelly, "By-Plant Prediction of Corn Grain Yield Using Height and Stalk Diameter", 2009, Publisher: Faculty of the Graduate College of the Oklahoma State University.

Haizhou Li, "Design and Evaluation of a Non-Intrusive Corn Population Sensor", Trace: Tennessee Research and Creative Exchange, Doctoral Dissertations, Graduate School, Aug. 2007, Publisher: University of Tennessee, Knoxville.

Luck et al., "Sensor Ranging Technique for Determining Corn Plant Population", Faculty Papers and Publications in Animal Science—Animal Science Department, 2008, vol. 920, Publisher: University of Nebraska—Lincoln.

Plattner et al., "Corn Plant Population Sensor for Precision Agriculture", 1996.

(56) References Cited

OTHER PUBLICATIONS

"AutoTrac RowSense", Precision AG, , Page(s) https://www.deere.com/sub-saharan/en/technology-products/precision-ag/autotrac-rowsense/, Publisher: John Deere SSA.

Reichhardt Electronic Innovations, "PSR Sensor Guidance", , Page(s) www.reichhardt.com/us_products_autosteer-system_autoguidance-tac.html, Publisher: Reichhardt Electronic Innovations.

Headsight, Inc., Row Guidance for Corn, Jan. 2021, Page(s) https://headsight.com/row-guidance-corn, Publisher: Headsight, Inc.

Yeyin Shi, "Corn Plant Location, Spacing and Stalk Diameter Measurements Using Optical Sensing Technologies", May 2014, Publisher: Faculty of the Graduate College of the Oklahoma State University.

Shrestha et al., "Automatic Corn Plant Population Measurement Using Machine Vision", Transactions of the ASAE, 2003, pp. 559-565, vol. 46(2), Publisher: American Society of Agricultural Engineers.

Sudduth et al., "Field Evaluation of a Corn Population Sensor", 2000.

Yu et al., "Outlier Elimination for Robust Ellipse and Ellipsoid Fitting", Oct. 24, 2009.

Area of a circle (Mar. 10, 2020). Wikipedia. Https://web.archive.org/web/20200325064526/https://en.wikipedia.org/wiki/Area_of_acircle (year 2020).

Contributions to Wikimedia projects (Feb. 20, 2020), Numerical integration. Wikipedia. Https://web.archive.org/web/20200325094046/https://en.wikipedia.org/wiki/numerical_integration (Year: 2020).

Gore, L. M. 1996. Report: Stalk counter for VRT study fall of 1995. Deere & Co. Moline, IL.

Miller et al (Nov. 16, 2016). The Plant Journal. https://onlinelibrary.wiley.com/doi/pdf/10.1111/tpj.13320.

Of GIS Ag Maps (here in as GIS), "Yield Monitor Data Post-Calibration (Linear and Non-Linear) Examples", Jan. 20, 2022, 8 pages + 1 SS page (9 pgs total).

Li, Dawei, et al. "An overlapping-free leaf segmentation method for plant point clouds." IEEE Access 7 (2019): 129054-129070 (Year: 2019).

\* cited by examiner

METHOD FOR WARNING OF A SHELLED EAR EVENT

CROSS-REFERENCE TO RELATED APPLICATION(S)

This application claims the benefit under 35 U.S.C. § 119(e) to U.S. Provisional Application 63/006,774, filed Apr. 8, 2020, and entitled Agricultural Devices, Systems, and Methods, which is hereby incorporated herein by reference in its entirety for all purposes.

TECHNICAL FIELD

The disclosure relates to various devices, systems, and methods for use in agricultural applications, particularly for use during agricultural harvest and in conjunction with corn headers.

BACKGROUND

It is appreciated by those of skill in the art that when a corn ear enters a harvester row unit at or slightly below the stripper plate, the stalk rolls may thresh or shell off kernels from the ear. These loose kernels may then fall to the ground and become unwanted header loss—lost yield. This harvesting error often goes undetected because it is typically only a periodic problem and in most circumstances is difficult to see from the cab.

There is a need in the art for improved devices, systems, and methods for minimizing loss during agricultural harvest.

BRIEF SUMMARY

Disclosed herein are various devices, systems, and methods for improving and monitoring yields during agricultural harvests.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Example 1 relates to a header warning system for a corn head comprising a plurality of row units, the header warning system comprising an operations unit comprising a processor and memory, and a plurality of sensing members, wherein at least one of the plurality of sensing members is disposed on one or more of the plurality of row units, wherein the plurality of sensing members are configured to detect shelled ear events ($E_d$).

In Example 2, the system of Example 1, wherein a shelled ear event is detected when at least one of the plurality of sensing members is deflected for a period of time greater than a threshold period of time.

In Example 3, the system of Example 1, wherein a shelled ear event is detected when at least one of the plurality of sensing members detect a stalk size greater than a threshold size.

In Example 4, the system of Example 3, wherein the stalk size is a diameter and a threshold diameter is about 1.5 inches.

In Example 5, the system of Example 1, further comprising a display in operative communication with the plurality of row units.

In Example 6, the system of Example 5, wherein the display is configured to emit to signal when the number of shelled ear events exceeds a predetermined threshold.

In Example 7, the system of Example 6, wherein the signal is at least one of an auditory or visual alarm.

Example 8 relates to a system for minimizing yield loss comprising a row unit on a corn header. The row unit comprising a pair of stripper plates defining a stripper plate gap on the row unit and at least one sensing member attached to the row unit, the at least one sensing member configured to measure one or more harvest metrics. The system also comprising a display comprising at least one processor, and wherein the display is configured to visualize and/or emit an alarm when a shelled ear event is detected.

In Example 9, the system of Example 8, wherein the at least one sensing member is attached to the row unit below the pair of stripper plates.

In Example 10, the system of Example 8, wherein the one or more harvest metrics include one or more of stalk diameter, stalk perimeter, deflection time, and stalk width.

In Example 11, the system of Example 8, wherein a shelled ear event is detected when the at least one sensing member detects a diameter that exceeds a threshold diameter.

In Example 12, the system of Example 8, wherein a shelled ear event is detected when the at least one sensing member is deflected for a period of time that exceeds a threshold period of time.

In Example 13, the system of Example 8, further comprising a header adjustment system configured to adjust the corn header height.

In Example 14, the system of Example 13, wherein the corn header height is lowered in response to detecting a shelled ear event.

Example 15 relates to a method for controlling header height comprising: generating a signal as an object passes through a row unit, establishing a signal threshold, wherein when the signal threshold is exceeded a shelled ear event is detected, comparing the signal to the signal threshold, and emitting an alarm with the signal exceeds the signal threshold.

In Example 16, the method of Example 15, wherein the signal comprises at least one of a stalk size, a deflection distance, and a deflection time.

In Example 17, the method of Example 15, further comprising ceasing the alarm when the signal no longer exceeds the signal threshold.

In Example 18, the method of Example 15, wherein the alarm is emitted when the signal exceeds the signal threshold after a time threshold is exceeded.

In Example 19, the method of Example 15, further comprising adjusting a header height in response to the alarm.

In Example 20, the method of Example 19, wherein the header height is incrementally lowered in response to the alarm.

In various implementations, the system defines or accesses a threshold ($D_t$) for use, and in certain implementations the threshold ($D_t$) can relate to measured stalk data or other parameters, certain non-limiting examples including stalk data such as width, diameter, time or other quantifiable or qualifiable limits, certain of which can be a range of values or properties, as would be understood.

In various implementations, the system utilizes measured stalk ($D_m$) data such as size, diameter, perimeter, deflection time, and/or width to detect shelled ear events ($E_d$), when $D_m > D_t$.

In certain implementations, the system defines a start of the shelled ear event ($E_{di}$) when a threshold ($D_t$) is exceeded. The system according to certain implementations may also determine the end of a shelled ear event ($E_{df}$) when one or more measured stalk data ($D_m$), such as diameter, size, or deflection time, returns to below or within a defined threshold ($D_t$) range.

In various implementations, the system defines or accesses an event threshold ($E_t$). Certain non-limiting examples of an event threshold ($E_t$) being a certain number of events ($E_d$) have been recorded; when a shelled ear event ($E_d$) lasts for a certain period of time or exceeds a time event threshold ($E_t$); or when another algorithmic parameter is met or has been exceeded as defined by the particular implementation of the system in operation.

While multiple embodiments are disclosed, still other embodiments of the disclosure will become apparent to those skilled in the art from the following detailed description, which shows and describes illustrative embodiments of the invention. As will be realized, the disclosure is capable of modifications in various obvious aspects, all without departing from the spirit and scope of the disclosure. Accordingly, the drawings and detailed description are to be regarded as illustrative in nature and not restrictive.

DETAILED DESCRIPTION

Discussed herein are various devices, systems, and methods for increasing yield by minimizing loss due to harvester error. In various implementations, a system is provided for emitting warnings/alarms when the corn head is not at an optimal height, such that yield is not lost due to shelling/threshing of ears by the stripper plates and/or stalk rolls.

Figure 1A:
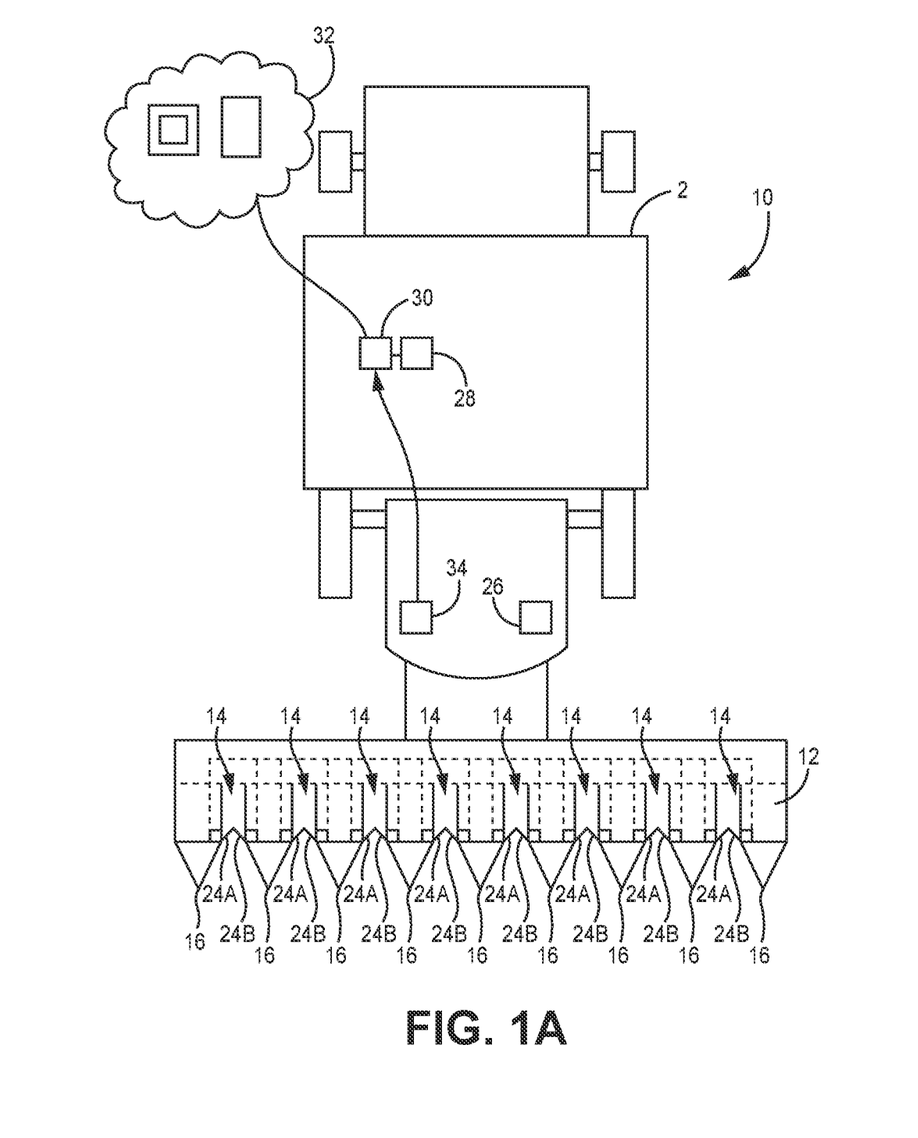
FIG. 1A is a top view of a harvester, according to one implementation.
Figure 1B:
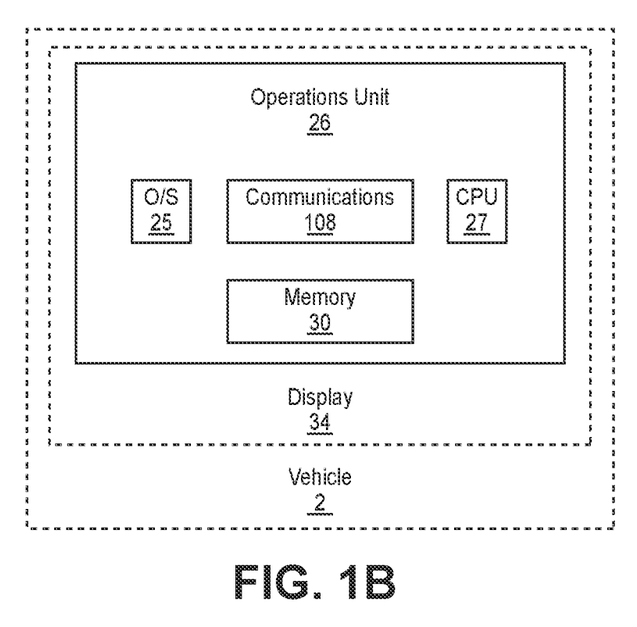
FIG. 1B is a schematic representation of one implementation of an operations unit.

Turning now to FIGS. 1A-1B, it is readily appreciated that the disclosed header warning system 10 may be used in connection with any known harvester 2. A harvester 2 having a header 12 and header warning system 10 may be configured to harvest row crops. In various implementations such as that of FIGS. 1A-1B, a harvester 2 is configured to harvest crops through the row units 14 disposed on the corn header 12, as would be readily appreciated.

Various harvester 2 configurations are possible and known in the art. In the implementation of FIGS. 1A-1B the harvester 2 includes a header 12 including a plurality of row units 14 divided by dividers 16.

Figure 2:
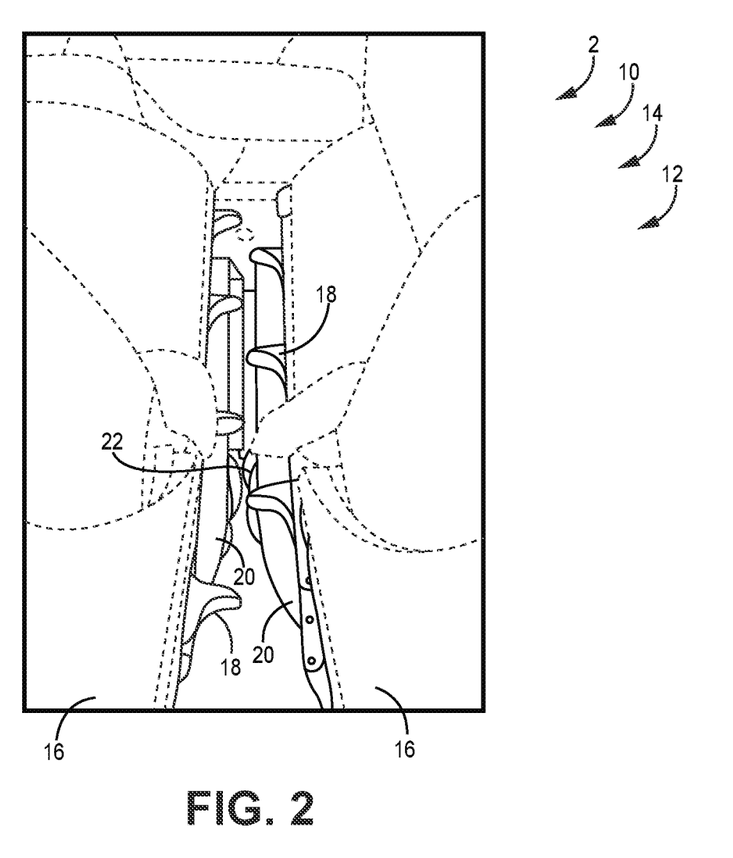
FIG. 2 shows a top view of a row unit, according to one implementation.

In various implementations, each row unit 14 may include gathering chains/fingers 18 located above the stripper plates 20, where the gathering chains 18 gather or pull the ears into the harvester 2 after the ears have been stripped from the stalks by the stripper plates 20, shown for example in FIG. 2. A row unit 14 may also include one or more stalk rolls 22 typically below the stripper plates 20 to crumple or otherwise pull stalks towards the soil. The typical operation of a corn header 12 row unit 14 is readily appreciated and understood by those of skill in the art. As would be understood, the plurality of row units 14 on a header 12 are typically substantially identical, while some variances are possible.

Returning to FIGS. 1A-1B, the row units 14 may include one or more sensing members 24A, 24B described in further detail below, such as in relation to FIG. 3. As shown in the implementation of FIGS. 1A-1B, the sensing members 24A, 24B according to certain implementations are in operational communication via a wired or wireless connection (not shown) with an operations unit 26, which may be located in the cab of the vehicle or harvester 2.

In various implementations of the system 10, the operations unit 26 comprises the various processing and computing components necessary for the operation of the system 10, including receiving, recording and processing the various received signals, generating the requisite calculations and commanding the various hardware, software and firmware components necessary to effectuate the various processes described herein. That is, in certain implementations, the operations unit comprises a processor that is in communication with memory and an operating system or software and sufficient media to effectuate the described processes, and can be used with an operating system 25, memory/data storage 30 and the like, as would be readily appreciated by those of skill in the art. It is appreciated that in certain implementations, the data storage 30 can be local, as shown in FIGS. 1A-1B, or cloud-based 32, or some combination thereof.

In various implementations, the system 10 operations unit 26 can comprise a circuit board, a microprocessor, a computer, or any other known type of processor or central processing unit (CPU) 27 that can be configured to assist with the operation of a system, such as the device disclosed or contemplated herein. In further embodiments, a plurality of CPUs can be provided and operationally integrated with one another and the various components, as utilized in other applications including the contemporaneously-filed applications incorporated by reference. Further, it is understood that one or more of the operations units 26 and or its processors can be configured via programming or software to control and coordinate the recordings from and/or operation of the various sensor components such as the sensing members 24A, 24B, as would be readily appreciated.

In certain implementations, the system 10 and/or operations unit 26 may utilize GPS 28 and a database 30 or other storage device such as the cloud 32, shown in FIGS. 1A-1B, to store and create row-by-row maps of shelled ear events ($E_d$). As discussed herein, shelled ear events ($E_d$) can include various events relating to the harvested crop, and occur when the measured stalk data ($D_m$) exceeds a defined threshold ($D_t$), as described below.

Further, the system 10 may be configured to numerically display the total number of shelled ear events ($E_d$) and/or an instantaneous rate of shelled ear events ($E_d$) on an in-cab or remote display, such as the display 34 shown in FIGS. 1A-1B. Various display 34 types are of course possible and are known in the art, such as the InCommand® display from Ag Leader.

In certain implementations, the header 12 height settings can be recorded and logged, such as via an on-board database 30 and/or cloud 32 storage system. In some implementations, the system 10 settings are recorded and logged with reference to the vehicle position, such as the GPS 28 position, as would be readily apparent to those of skill in the art from the incorporated references. In these and other implementations, the system 10 may create and display maps to provide insights into crop conditions and performance, such as via a display 34.

In these and other implementations, the system 10 may analyze the recorded data to determine causes of low yields. For example, a low header 12 height may indicate a lodged stalk area or short corn due to a wet area. Knowledge of yield loss issues may help operators and other stakeholders maximize yields in subsequent plantings.

Certain of the disclosed implementations can be used in conjunction with any of the devices, systems or methods taught or otherwise disclosed in U.S. Pat. No. 10,684,305 issued Jun. 16, 2020, entitled "Apparatus, Systems and Methods for Cross Track Error Calculation From Active Sensors," U.S. patent application Ser. No. 16/445,161, filed Jun. 18, 2019, entitled "Agricultural Systems Having Stalk Sensors and/or Data Visualization Systems and Related Devices and Methods," U.S. patent application Ser. No. 16/800,469, filed Feb. 25, 2020, entitled "Vision Based Stalk Sensors and Associated Systems and Methods," U.S. patent application Ser. No. 17/013,037, filed Sep. 4, 2020, entitled "Apparatus, Systems and Methods for Stalk Sensing," U.S. patent application Ser. No. 16/918,300, filed Jul. 1, 2020, entitled "Apparatus, Systems, and Methods for Eliminating Cross-Track Error," U.S. patent application Ser. No. 16/921,828, filed Jul. 6, 2020, entitled "Apparatus, Systems and Methods for Automatic Steering Guidance and Visualization of Guidance Paths," U.S. patent application Ser. No. 16/939,785, filed Jul. 27, 2020, entitled "Apparatus, Systems and Methods for Automated Navigation of Agricultural Equipment," U.S. Patent Application 63/048,797, filed Jul. 7, 2020, entitled "Apparatus, Systems, and Methods for Grain Cart-Grain Truck Alignment and Control Using GNSS and/or Distance Sensors," U.S. Patent Application 63/074,737, filed Sep. 4, 2020, entitled "Apparatus, Systems and Methods for an Electric Corn Head," U.S. Patent Application 63/137,946, filed Jan. 15, 2021, entitled "Apparatus, Systems, and Methods for Row Crop Headers," U.S. patent application Ser. No. 17/226,002, filed Apr. 8, 2021, and entitled "Apparatus, Systems and Methods For Stalk Sensing," and U.S. patent application Ser. No. 17/225,740, filed Apr. 8, 2021, and entitled "Devices, Systems, and Methods For Sensing The Cross-Sectional Area of Stalks," each of which are incorporated herein by reference.

Continuing with FIG. 2, when corn ears enter a row unit 14 at or slightly below the stripper plate 20 height, the stalk rolls 22 may thresh or shell off kernels from the ear thereby causing header loss and reducing overall yield. As would be appreciated, this type of yield loss and harvester error often goes unnoticed or unaccounted for due to the periodic nature of the error and difficulty in visualizing such error from the cab of a harvester 2.

In some implementations, the harvester 2 may include a header warning system 10 constructed and arranged to signal an operator when the height of the header 12 is at an incorrect height and causing yield loss. In various implementations, the system 10 signals an operator that the header 12 is too high and therefore shelling ears causing yield loss. This signal or warning may allow an operator to act and lower the header 12 to prevent any further yield loss due to this type of header error. In certain implementations, the system 10 may automatically lower to the header 12 when shelling conditions are detected, as will be explained further below. The header 12 may be lowered dynamically and/or incrementally until the stripper plates 20 are below the stalk ear height.

Figure 3:
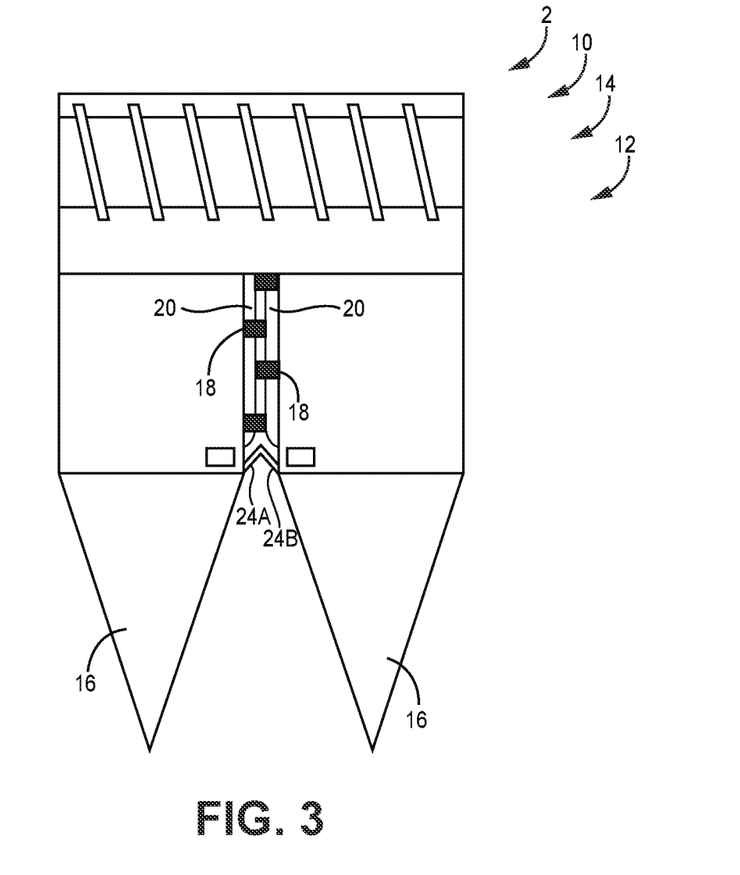
FIG. 3 shows a top view of a row unit, according to one implementation.

In various implementations, the row units 14 may include one or more sensing members 24A, 24B near the stripper plates 20, as shown in FIG. 3. In various implementations, the sensing members 24A, 24B are located just below the stripper plates 20. Exemplary sensing members 24A, 24B are shown in FIGS. 4A-5C.

Figure 4A:
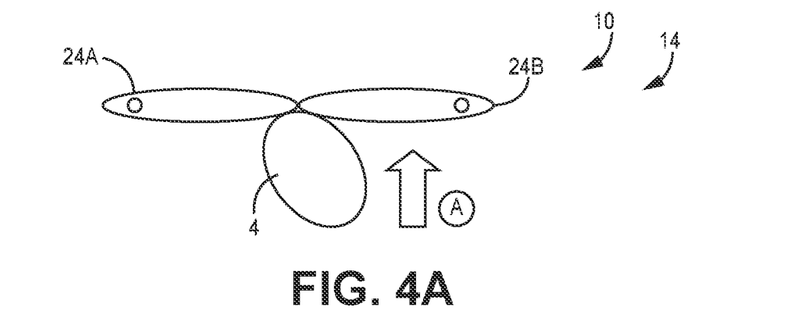
FIG. 4A depicts a schematic drawing of a stalk passing through sensing members, according to one implementation.
Figure 4B:
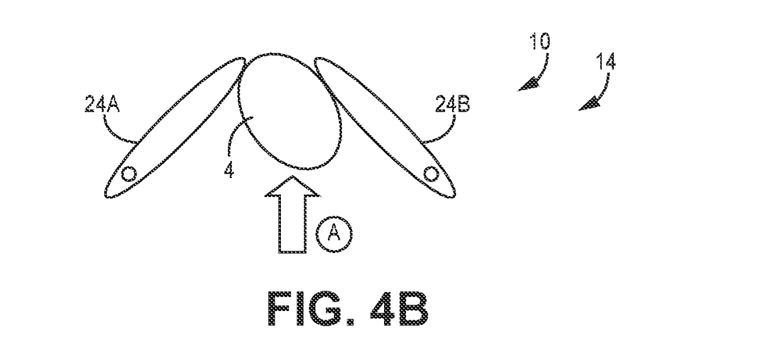
FIG. 4B depicts a further schematic drawing of a stalk passing through sensing members, according to one implementation.
Figure 4C:
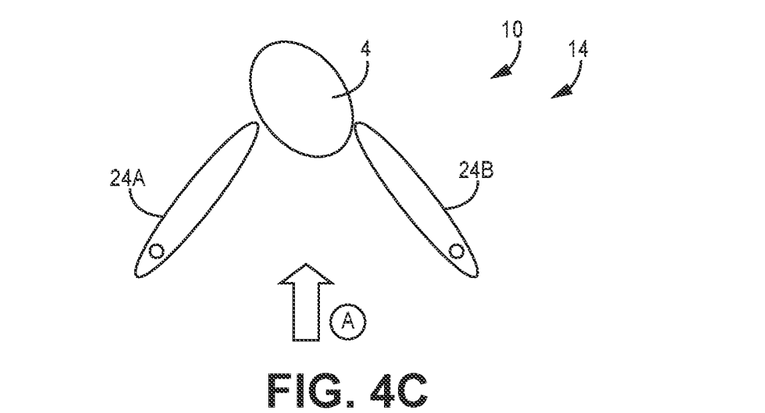
FIG. 4C depicts yet another schematic drawing of a stalk passing through sensing members, according to one implementation.

FIGS. 4A-C show one implementation of the system 10 sensing members 24A, 24B where the sensing members 24A, 24B are pivotally attached to the row unit 14. In these and other implementations, the sensing members 24A, 24B are pivotally attached to the row unit 14 such that as a stalk 4 passes through the row unit 14 in the direction of reference arrow A, the sensing members 24A, 24B correspondingly pivot, thereby generating displacement data. The pivoting movement of the sensing members 24A, 24B may be detected by various sensors and used for various harvesting methods and metrics.

Figure 5A:
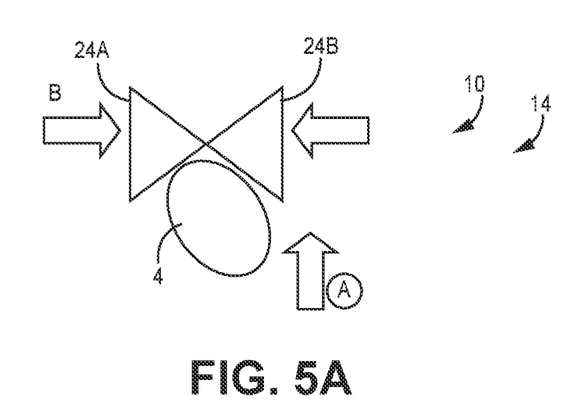
FIG. 5A depicts a schematic drawing of a stalk passing through sensing members, according to one implementation.
Figure 5B:
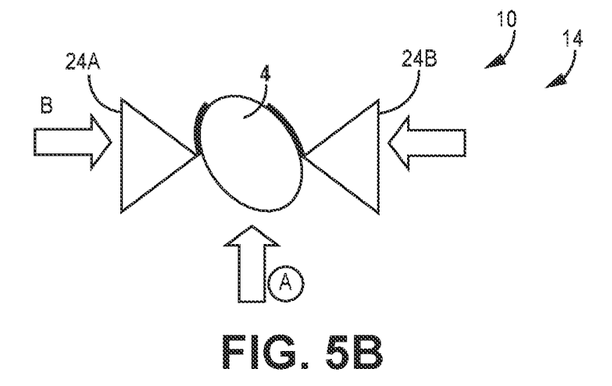
FIG. 5B depicts another schematic drawing of a stalk passing through sensing members, according to one implementation.
Figure 5C:
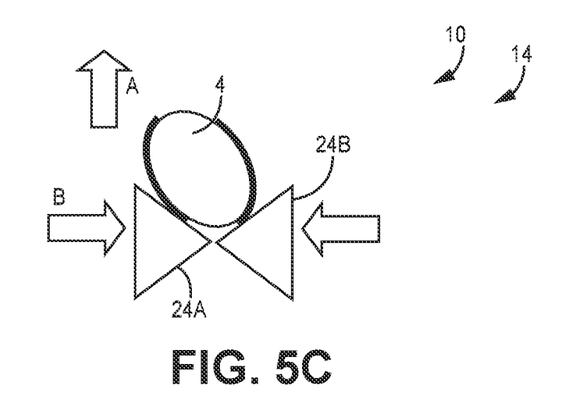
FIG. 5C depicts yet another schematic drawing of a stalk passing through sensing members, according to one implementation.

FIGS. 5A-C depict an alternative implementation of the sensing members 24A, 24B. In this implementation, the sensing members 24A, 24B are not pivotally attached to the row unit 14 but rather move laterally with respect to the row unit 14. That is, in these implementations, the sensing members 24A, 24B may be urged towards the center of the row unit 14, in the direction of reference arrow B, in their neutral state and urged apart, in the direction opposite of reference arrow B, when a stalk 4 passes through the row unit 14. As the sensing members 24A, 24B move with respect to the row unit 14 various data is generated regarding the orientation and/or movement of the sensing members 24A, 24B that may be utilized by the system 10, as will be discussed herein.

Various alternative sensing members 24A, 24B and systems are described in U.S. application Ser. No. 17/013,037 entitled "Apparatus, Systems and Methods For Stalk Sensing," filed on Sep. 4, 2020, U.S. application Ser. No. 16/800,469, entitled "Vision Based Stalk Sensors and Associated Systems and Methods," filed on Feb. 28, 2020, and U.S. application Ser. No. 16/445,161, entitled "Agricultural Systems Having Stalk Sensors and/or Data Visualization Systems and Related Devices and Methods," filed Jun. 18, 2019, and other applications incorporated by reference herein.

When a header 12 is at the improper height, such as being too high, a corn ear may come into contact with the stripper plates 20 and/or sensing members 24A, 24B, causing yield loss as described above. When a corn ear contacts the sensing members 24A, 24B, the sensing members 24A, 24B may be urged into an extreme open position, or position beyond the typical range, as would be appreciated, or otherwise caused to move/rotate a greater distance and/or for a longer duration than when only contacting a stalk 4. This is because a corn ear typically has a greater diameter than a stalk 4. This type of contact and movement of the sensing members 24A, 24B is abnormal and can be distinguished by the system 10 from the signal generated by the sensing members 24A, 24B when a stalk 4 is passing through.

Figure 6A:
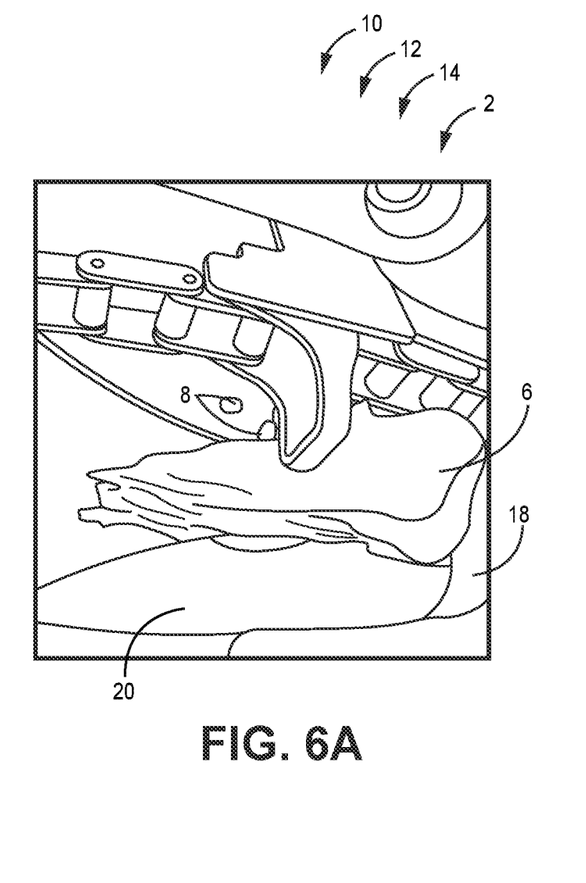
FIG. 6A shows a top perspective view of a row unit during a shelled ear event, according to one implementation.
Figure 6B:
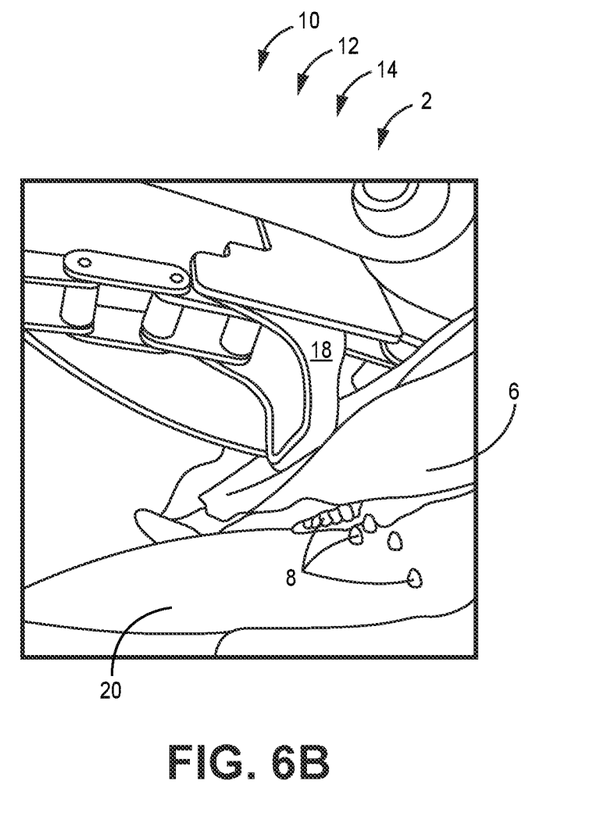
FIG. 6B shows a top perspective view of a row unit during a shelled ear event, according to another implementation.
Figure 6C:
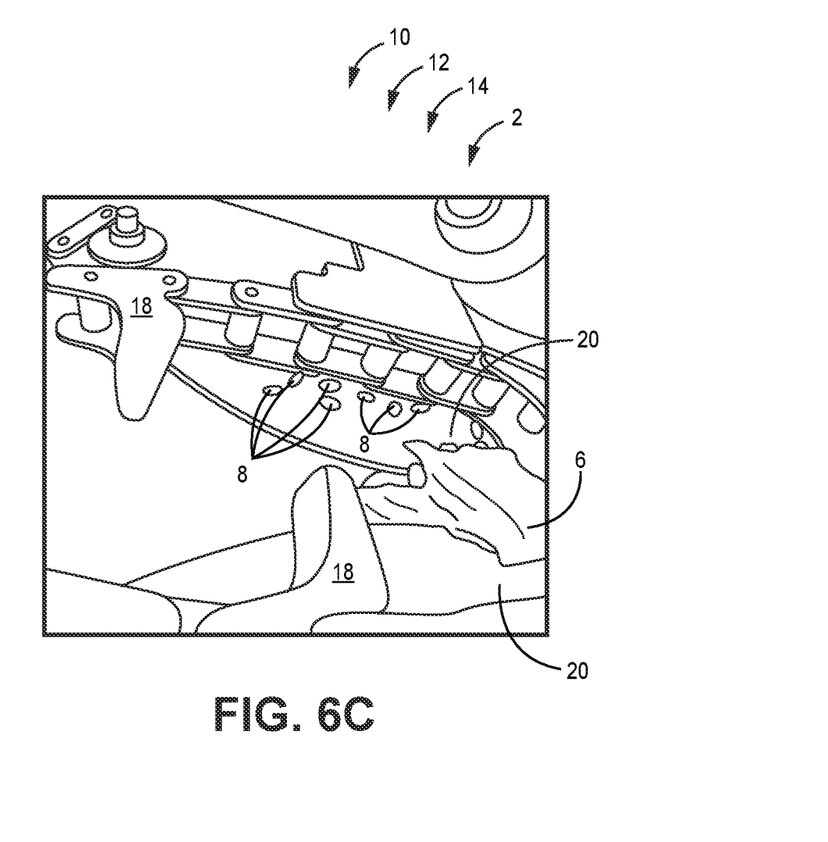
FIG. 6C shows a top perspective view of a row unit during a shelled ear event, according to a further implementation.

FIGS. 6A-C show an exemplary implementation of the header 12 being too high and causing lost yield. In FIG. 6A the header 12 is too high causing an ear 6 to enter into the gap between the stripper plates 20, instead of the optimal position where the ear remains above the stripper plates. As the ear traverses the row unit 14, the corn ear 6 is shelled and kernels 8 fall from the ear 6, as shown in FIG. 6B. Continuing to FIG. 6C the corn ear 6 may fall entirely below the stripper plates 20 and cause lost yield for the entire ear 6, alternatively the ear 6 may ultimately be gathered by the harvester 2 but only after kernels are separated from the ear 6 and lost to the ground.

Figure 7:
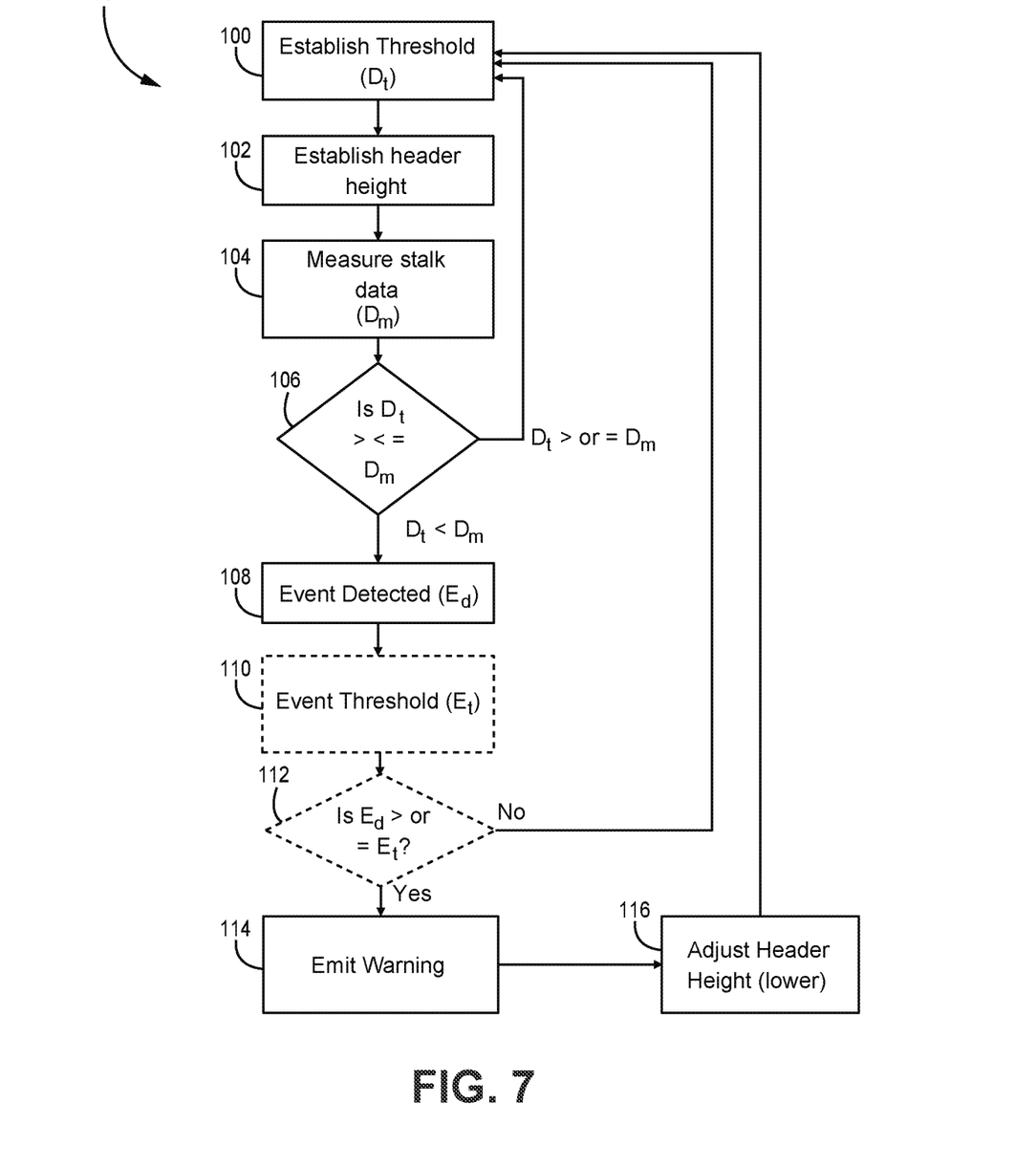
FIG. 7 shows a systematic diagram of the system, according to one implementation.

Turning now to FIG. 7, in various implementations, the system 10 is configured to execute a series of steps, each of which is optional and may be performed in any order or not at all. In one optional step, the system 10 is constructed and arranged to access or establish a threshold ($D_t$) (box 100). In various implementations, the threshold ($D_t$) is established (box 100) by an operator, whereby an operator enters the threshold ($D_t$) value into the system 10. In an alternative implementation, the system 10 establishes the threshold ($D_t$) (box 100) by deriving or otherwise accessing the threshold ($D_t$) from historical harvest data, such as by using various machine learning techniques and methods, as would be understood.

In certain implementations, the threshold ($D_t$) is a stalk data threshold ($D_t$), or other value that may be detected be the header 12 and/or sensing members 24A, 24B, such as a stalk perimeter, stalk diameter, displacement of sensing members 24A, 24B, such as by magnetic readings, or width measurement. In various implementations, the threshold ($D_t$) is the value over which the system 10 recognizes that it is not in contact with a stalk 4 but rather an ear 6 or other item of foreign material.

In one such example, the threshold is a diameter threshold ($D_t$) and more specifically in certain implementations a diameter threshold ($D_t$) of 1.5 inches. In an alternative implementation, the deflection time threshold ($D_t$) is defined such that a longer deflection period at a given harvester 2 speed is indicative of an ear 6 or other foreign matter in contact with a stalk 4, as would be readily appreciated.

The example discussed herein will use a diameter threshold ($D_t$), but it would be readily understood the certain modifications may be made to the overall system 10 to utilize various alternative data inputs.

In a further optional step, the system 10 establishes header 12 height. In various implementations, the height of the header 12 height is obtained via a sensor or other known mechanism on the header 12 or harvester 2.

In another optional step, the system 10 may measure stalk data to generate measured stalk data ($D_m$) via the sensing members 24A, 24B (box 104) as the harvester 2 traverses a field. Further, as noted above, the system 10 may utilize various measured stalk data ($D_m$) such as size, diameter, perimeter, deflection time, and/or width to detect shelled ear events.

In another optional step, the system 10 compares the threshold ($D_t$) to the measured stalk data ($D_m$) (box 106)—in one specific example a width threshold ($D_t$) is compared to measured width as an aspect of measured stalk data ($D_m$). In this specific example, in circumstances where the size threshold ($D_t$) is greater than or equal to the measured size that is an aspect of measured stalk data ($D_m$), a shelled ear event is not detected the harvester 2 and system 10 continues operating at its current state.

In circumstances where the size threshold ($D_t$) is less than the measured size data that is an aspect of measured stalk data ($D_m$), a shelled ear event ($E_d$) is detected (box 108). In certain implementations, the system 10 defines a start of a shelled ear event ($E_{di}$) when a threshold ($D_t$) is exceeded. The system 10 may also determine the end of a shelled ear event ($E_{df}$) when one or more measured stalk data ($D_m$), such as diameter, size, or deflection time, returns to below or within a defined threshold ($D_t$) range.

When a shelled ear event ($E_d$) is detected (box 108) the system 10 may then emit a warning (box 114) altering an operator of the event. In various implementations, the warning is a visual, audio, or other warning that will be brought to the attention of the operator, as would be readily understood by the skilled artisan.

In various alternative implementations, an alarm and/or signal is not emitted after a single shelled ear event ($E_d$), but rather the system 10 indicates to an operator or otherwise records that a shelled ear event ($E_{di}$) has begun after an event threshold ($E_t$) has been reached. Certain non-limiting examples of an event threshold ($E_t$) being a certain number of shelled ear events ($E_d$) have been recorded; when a shelled ear event ($E_d$) lasts for a certain period of time or exceeds a time event threshold ($E_t$); or when another algorithmic parameter is met or has been exceeded as defined by the particular implementation of the system 10 in operation.

In certain of these implementations, an event threshold ($E_t$) is established (box 110) by the system 10. In various implementations, the event threshold ($E_t$) may be entered by an operator, derived from historical harvest data, and/or otherwise established via computerized methods as would be appreciated, such as via a system update to the software and/or firmware. In some implementations, the event threshold ($E_t$) is a defined number of events, a defined time, and/or other algorithm selected to maximize detection of shelled ear event and lost yield while minimizing nuisance alarms. It is also readily appreciated that in certain implementations, the operator has the ability to mute the alerts/alarms, as would be readily appreciated.

In one example, the system 10 compares the number of events detected ($E_d$) to the threshold number of events ($E_t$) (box 112) and emits an alarm (box 114) after a set number of shelled ear events ($E_d$) exceeds a threshold number of events or event threshold ($E_t$) in a certain period of time. In various implementations, the threshold ($E_t$) may be a number of shelled ear events ($E_d$) per minute, a percentage of shelled ear events ($E_d$) over a period of time, area, or stalk count, or a number of shelled ear events ($E_d$) per area. In various implementations, the system 10 may utilize one or more event thresholds ($E_t$) to trigger the alarm.

In these and other implementations, the alarm may indicate to an operator that the height of the header 12 is causing yield loss. In another optional step, the operator may choose to adjust the header 12 height (box 116), such as by lowering the header 12. In some implementations, the header 12 is adjusted (box 116) manually, such as in small increments until the alarm ceases. The increments may be of about one (1) inch, although other amounts are possible as would be understood by those of skill in the art. In alternative implementations, the header 12 height may be adjusted (box 116) automatically until the alarm ceases, such as via actuators and/or other understood commanded heigh adjustment mechanisms. In various implementations, the header 12 may be adjusted at a certain rate such as about one (1) inch per second or another rate as would be appreciated.

In various implementations utilizing automatic lowering of the header 12 upon exceeding the event threshold ($E_t$), the corn header 12 may be automatically lowered in increments until the alarm ceases or the header 12 reaches a user entered minimum height.

In some implementations, the system 10 may automatically raise the header 12 in small increments, manually or automatically, until the alarm is triggered or the header 12 reaches a maximum height, which may be defined and/or stored within the system, as would be appreciated. In certain implementations, the header 12 may be raised when no shelled ear events have been detected for a threshold period of time, such as about fifteen (15) seconds. In another implementation, the header 12 may be raised after the harvester 2 has traveled more than a threshold distance, such as about one-hundred (100) feet. Various alternative circumstances for raising a header 12 are possible and would be understood by those of skill in the art.

In various implementations, cessation of the alarm may signal to the operator that the header 12 is at a proper height such that unnecessary yield loss from shelled ear events is no longer occurring. In some implementations, the alarm will cease when the number of shelled ear events ($E_d$) falls below the set threshold value ($E_t$), or other threshold is no longer being met or exceeded as applicable to a particular implementation. Further alarm types and patterns would be readily appreciated by the skilled operator.

Although the disclosure has been described with references to various embodiments, persons skilled in the art will recognized that changes may be made in form and detail without departing from the spirit and scope of this disclosure.

What is claimed is:

1. A method for warning an operator of a shelled ear event, comprising:
   measuring movement of at least one sensing member during harvest operations, the at least one sensing member disposed below a stripper plate of a row unit; wherein the movement of the at least one sensing member indicates one or more of a stalk diameter and a stalk perimeter; and
   determining a threshold range for movement of the at least one sensing member wherein when the threshold range is met a stalk is passing through the row unit and wherein when the threshold range is exceeded an alarm is emitted indicating a shelled ear event,
   wherein when the threshold range is exceeded a harvester header is lowered incrementally until the threshold range is met.

2. The method of claim 1, wherein the threshold range is a distance range and/or a time range.

3. The method of claim 1, further comprising logging values of the movement of the at least one sensing member and logging location at which the threshold range is exceeded.

4. The method of claim 1, further comprising monitoring a header height during harvest operations, and logging the header height when the threshold range is exceeded.

* * * * *